(12) United States Patent
Hess

(10) Patent No.: US 6,244,608 B1
(45) Date of Patent: Jun. 12, 2001

(54) RAMP-ACCOMMODATING MOVABLE SUBFRAME FOR A SEMI-TRAILER

(75) Inventor: Timothy V. Hess, Smithville, OH (US)

(73) Assignee: The Boler Company., Itasca, IL (US)

( * ) Notice: Subject to any disclaimer, the term of this patent is extended or adjusted under 35 U.S.C. 154(b) by 0 days.

(21) Appl. No.: 09/405,454

(22) Filed: Sep. 24, 1999

(51) Int. Cl.$^7$ ........................................................ B60P 9/00
(52) U.S. Cl. ........................ 280/149.2; 14/69.5; 414/558
(58) Field of Search ..................... 280/149.2, 676; 180/24.02, 209; 414/558, 537; 14/69.5

(56) References Cited

U.S. PATENT DOCUMENTS

| | | | |
|---|---|---|---|
| 4,958,845 | * | 9/1990 | Parks .................................. 280/407.1 |
| 5,720,489 | * | 2/1998 | Pierce et al. ....................... 280/149.2 |

* cited by examiner

Primary Examiner—Eric Culbreth
(74) Attorney, Agent, or Firm—Buckingham, Doolittle & Burroughs, LLP; David P. Dureska

(57) ABSTRACT

A movable subframe or slider for a semi-trailer is modified to provide a storage bay between the slider and semi-trailer for accommodating a walk ramp and its carrier hardware. A reinforced elongated spacer cap is mounted on the uppermost surface of each main member and associated cross members of the slider. The spaced-apart parallel caps provide sufficient clearance between the bottom surface of the trailer body and the uppermost surface of the slider cross members, for mounting a walk ramp and its carrier hardware on the underside of the trailer body. The pins and coil springs of the retractable locking pin mechanism of the slider are relocated upwardly into the spacers. Rail guides and low frictions strips also are relocated from the slider main members to the spacer caps. This relocation enables the modified slider to be mounted on standard body rails of a semi-trailer, which are mounted on and depend from the underside of the trailer body. The modified slider thus can be efficiently retrofitted on semi-trailers adding a walk ramp but having a prior art slider and standard body rails, merely by replacing the prior art slider with the modified slider, and can also be used on newly manufactured semi-trailers incorporating a walk ramp.

11 Claims, 6 Drawing Sheets

RAMP-ACCOMMODATING MOVABLE SUBFRAME FOR A SEMI-TRAILER

BACKGROUND OF THE INVENTION

1. Field of the Invention

The invention relates to semi-trailer subframes, and in particular to movable subframes for a semi-trailer. More particularly, the invention is directed to a movable subframe for a semi-trailer which accommodates storage of a walk ramp beneath the semi-trailer.

2. Background Art

Movable subframes, typically referred to as sliders, have been utilized on semi-trailers or tractor-trailers for many years. One or more axle/suspension systems usually are suspended from a single slider structure. The slider in turn is mounted on the underside of the trailer body, and is movable longitudinally therealong to provide a means of variable load distribution. More specifically, the amount of cargo that a trailer may carry is governed by local, state and/or national road and bridge laws, and is dependent on proper load distribution. The basic principle behind most road and bridge laws is to limit the maximum load that a vehicle may carry, as well as to limit the maximum load that can be supported by individual axles. A trailer having a slider gains an advantage with respect to laws governing maximum axle loads. More particularly, proper placement of the slider varies individual axle loads or redistributes the trailer load so that it is within legal limits.

Once properly positioned, the slider is locked in place on the underside of the trailer by a retractable pin mechanism. The retractable pin mechanism generally includes two or more, and typically four, retractable pins which may be interconnected by a usually manually or pneumatically actuated crank mechanism. When the pins are in their extended or outboardmost position, they each extend through a respective opening formed in the slider and into a selected aligned one of a plurality of openings formed in rails depending from the trailer body. The pins thereby lock the slider in a selected position relative to the trailer body.

However, known prior art sliders fail to provide for incorporation of a storable walk ramp beneath the trailer. Such walk ramps typically are required on trailers used in food service and appliance delivery applications, as well as in other applications. Since known prior art sliders are not made to accommodate storage of a walk ramp, if a ramp must be installed on a trailer having a prior art slider, a pair of large steel spacers usually is attached to the bottom of the trailer and extends the full length of the body rails, which is typically about 200 to 300 inches. The spacers are needed to provide clearance for the walk ramp carrier, which has a cross-section of approximately 6 inches high by 28 inches wide and is mounted on the underside of the trailer. The trailer body rails then can be attached to the bottom of the spacers, instead of the bottom of the trailer, and the slider in turn is mounted on the rails in the usual manner. Unfortunately, while such an arrangement of parts accommodates storage of the walk ramp when not in use and its carrier, the prior art spacer system adds significant unwanted weight to the semi-trailer.

The present invention solves the above-described weight problem in the following manner. Rather than attaching spacers the entire length of the trailer body rails, a spacer cap is attached directly to each main member of the slider and measures only about 96 inches in length, thus saving significant weight over the above-described prior art arrangement of parts. The slider locking pins are relocated into the spacer caps to allow standard trailer body rails to be utilized. The present invention can be utilized in new trailer manufacturing, as well as on existing trailers of semi-trailers using prior art sliders, to easily convert such existing trailers to accommodate walk ramp storage merely by replacing the prior art slider with the slider of the present invention. This ease of conversion should be compared to the case where it is desired to utilize the prior art walk ramp storage spacer system, which would require that the rails be cut off the trailer body, the spacers installed, and the rails reattached.

SUMMARY OF INVENTION

Objectives of the present invention include providing a ramp-accommodating movable subframe for a semi-trailer, which provides for incorporating a storable walk ramp beneath the trailer, and also limits the addition of weight to the semi-trailer from incorporation of the walk ramp.

Another objective of the present invention is to provide such a ramp-accommodating movable subframe for a semi-trailer, which can be quickly and easily retrofit on existing semi-trailers.

A still further objective of the present invention is to provide such a ramp-accommodating slider for a semi-trailer, which is economical to install, durable in use and easy to maintain.

These objectives and advantages are obtained by a subframe structure for a vehicle trailer, the subframe structure being movably mountable on spaced-apart, parallel and longitudinally extending elongated rails mounted on the bottom of said trailer, the trailer rails each being formed with a plurality of openings, the subframe structure including a pair of spaced-apart, parallel and longitudinally extending elongated main members, and at least one cross-member structure extending between and being connected to the main members to maintain the spaced-apart parallel relationship between the main members, wherein the improvement comprises spacer means including, an elongated spacer member mounted on each of the main members and extending substantially the entire length of the main members, the spacer members each including means for movably engaging a respective one of the trailer rails, the spacer members each further being formed with at least one locking pin opening, the spacer member opening being selectively alignable with its respective trailer rail openings, and at least one locking pin mounted on each of the spacer members adjacent to its respective locking pin opening, the locking pin further being generally complementary-sized and shaped for passage through the respective aligned openings, the locking pin being operatively connected to a locking pin retraction mechanism, the retraction mechanism and the locking pin being operable for locking the subframe structure in one selected position relative to the vehicle trailer when the locking pin extends through the aligned openings, and for unlocking the subframe structure for moving the subframe structure to another selected position beneath the trailer when the locking pin is retracted from the aligned openings, the spacer means providing a bay generally defined by the bottom of the trailer, the subframe cross-member structure and the spacer members, so that a walk ramp is mountable in the bay.

BRIEF DESCRIPTION OF THE DRAWINGS

The preferred embodiment of the invention, illustrative of the best mode in which applicant has contemplated applying the principles, is set forth in the following description and is shown in the drawings and is particularly and distinctly pointed out and set forth in the appended claims.

Similar numerals refer to similar parts throughout the drawings.

DESCRIPTION OF THE PREFERRED EMBODIMENT

Figure 1:
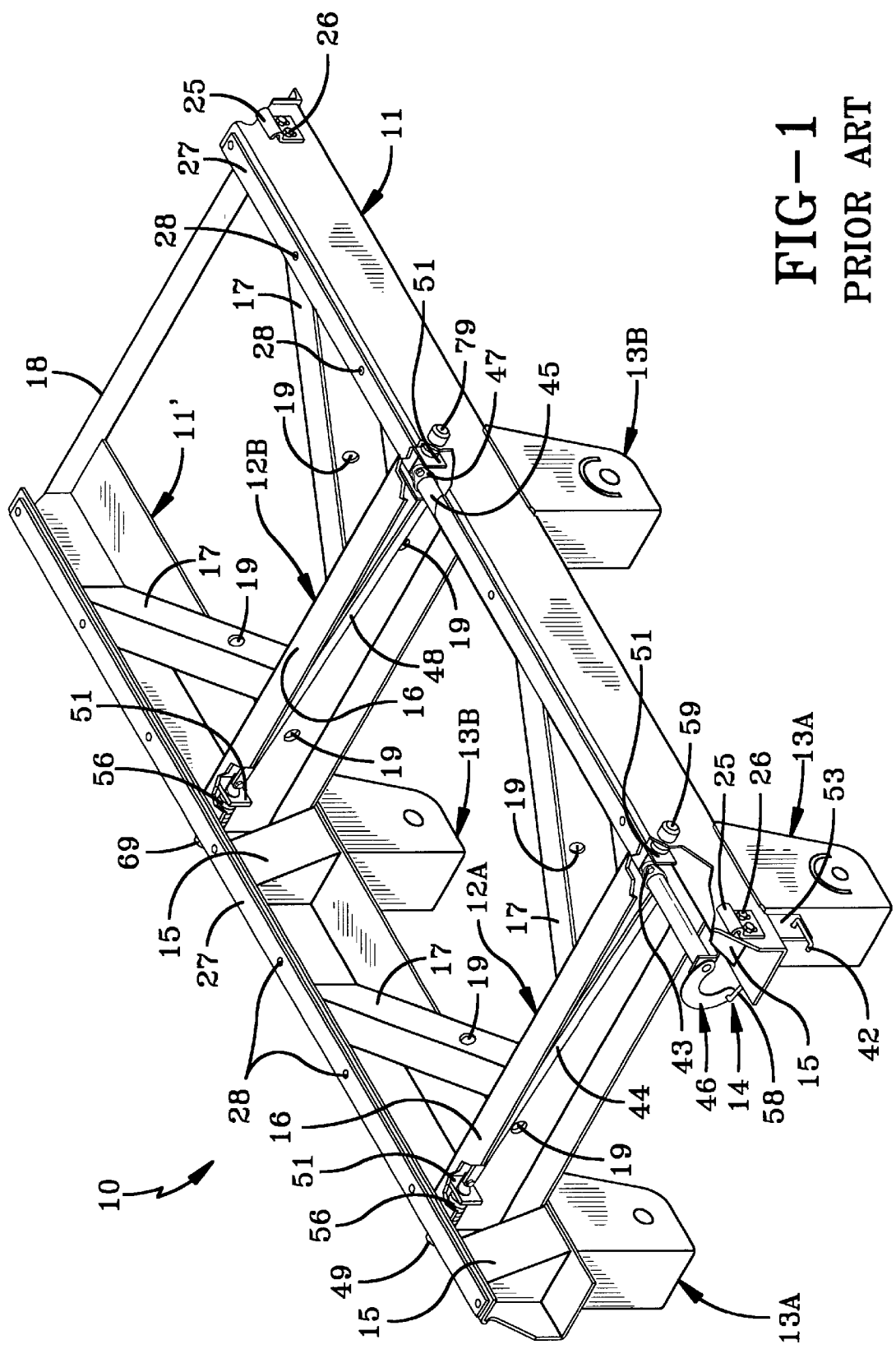
FIG. 1 is a perspective view, with portions broken away, of a prior art movable subframe for a semi-trailer.
Figure 2:
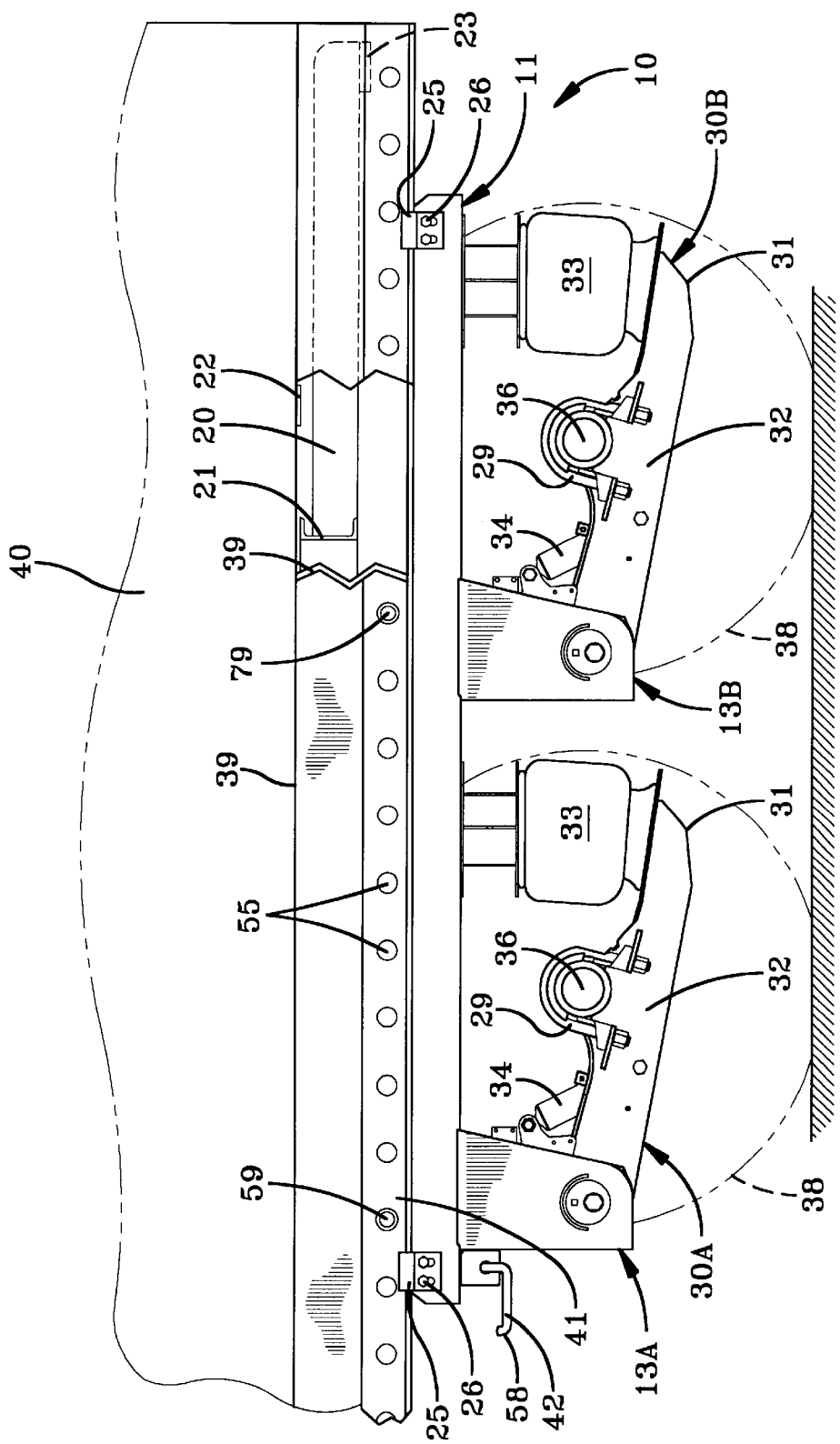
FIG. 2 is a fragmentary elevational view, with portions broken away and shown in phantom lines, of a prior art slider mounted on a semi-trailer which has been modified for storage of a walk ramp.
Figure 3:
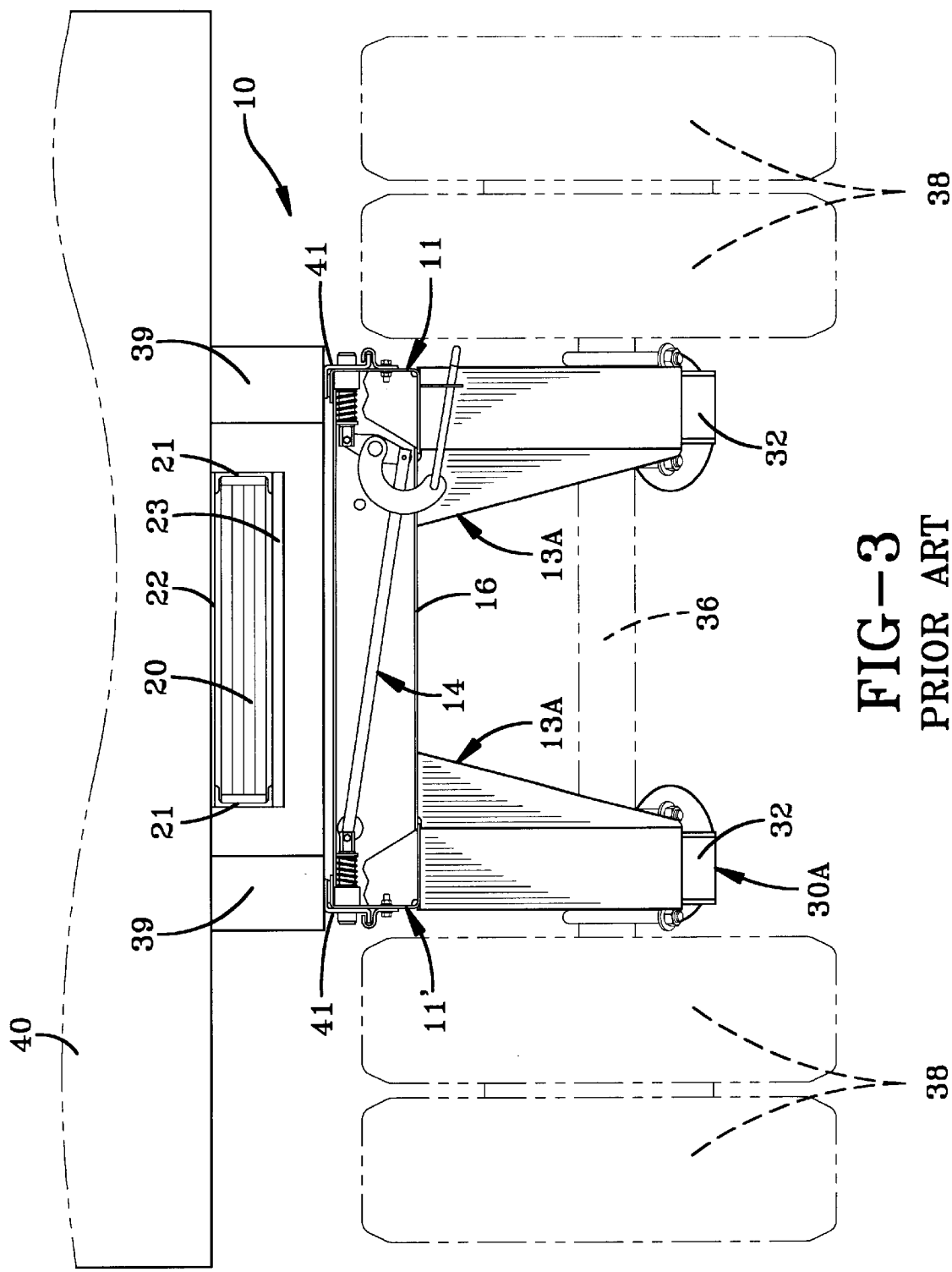
FIG. 3 is an enlarged fragmentary front view, with portions broken away and shown in phantom lines, of the prior art slider and trailer shown in FIG. 2.
Figure 4:
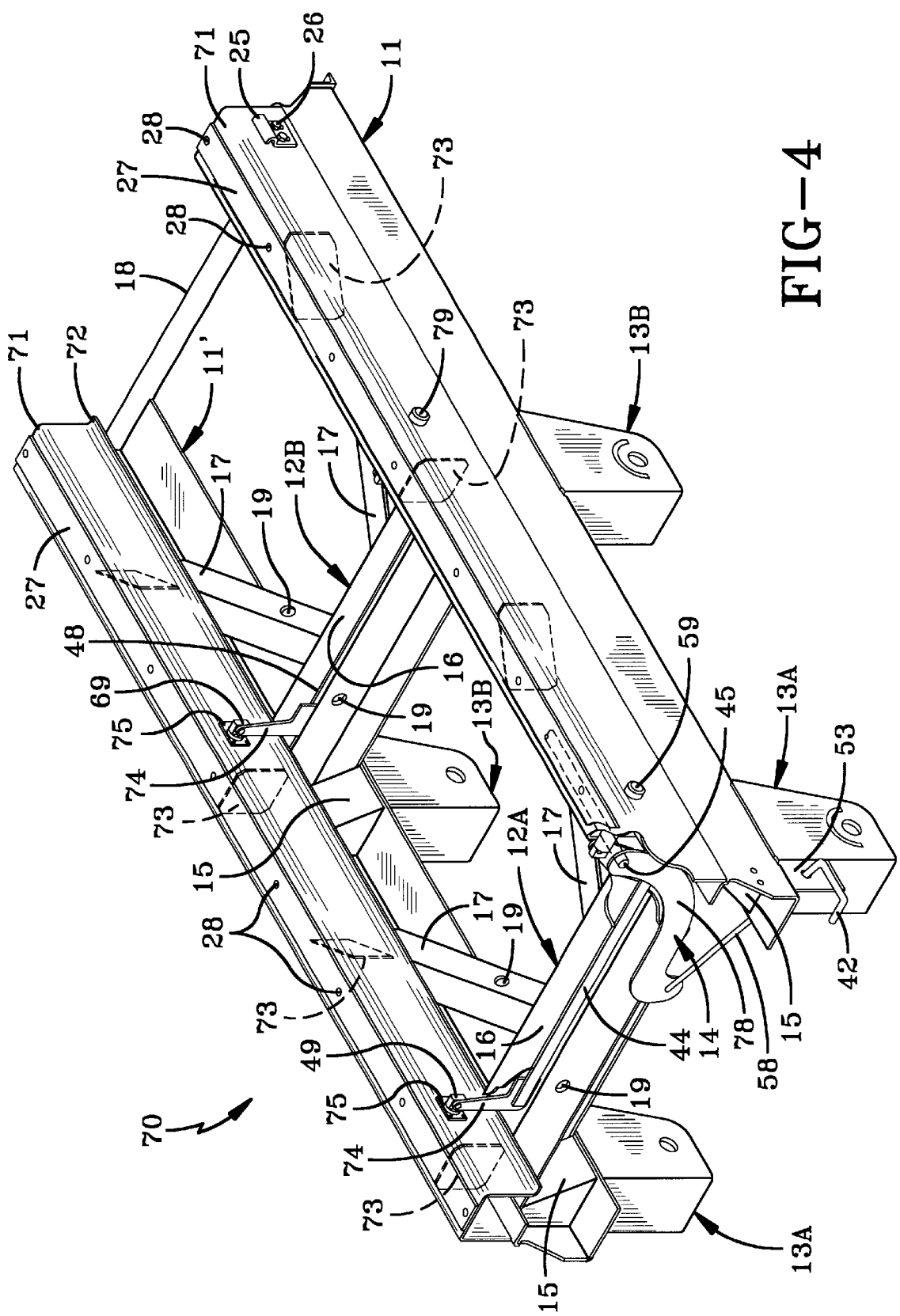
FIG. 4 is a perspective view, with portions broken away and shown in phantom lines, of the ramp-accommodating movable subframe for a semi-trailer of the present invention.
Figure 5:
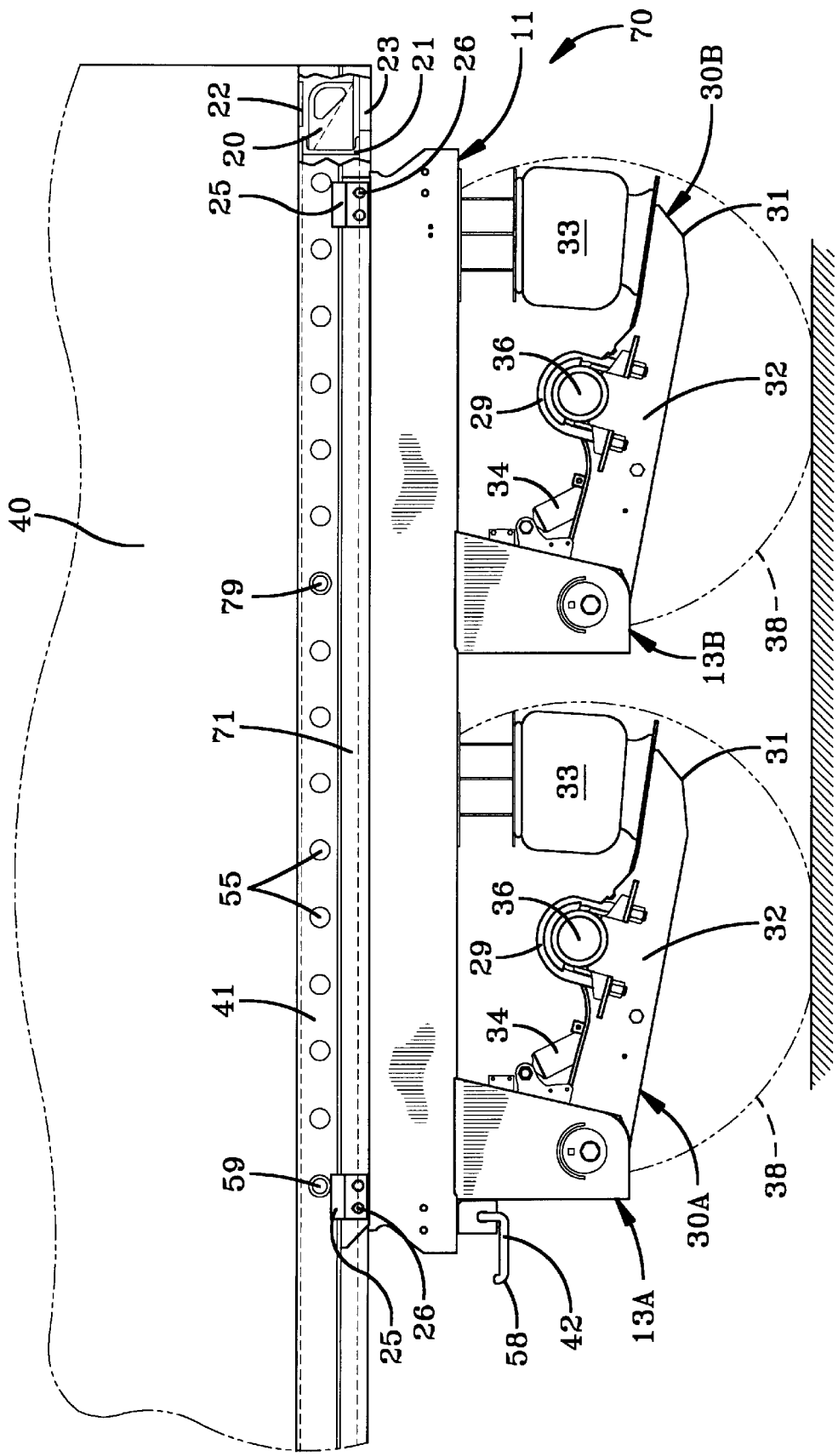
FIG. 5 is a fragmentary elevational view, with portions broken away and shown in phantom lines, of the slider of the present invention mounted on an unmodified semi-trailer.
Figure 6:
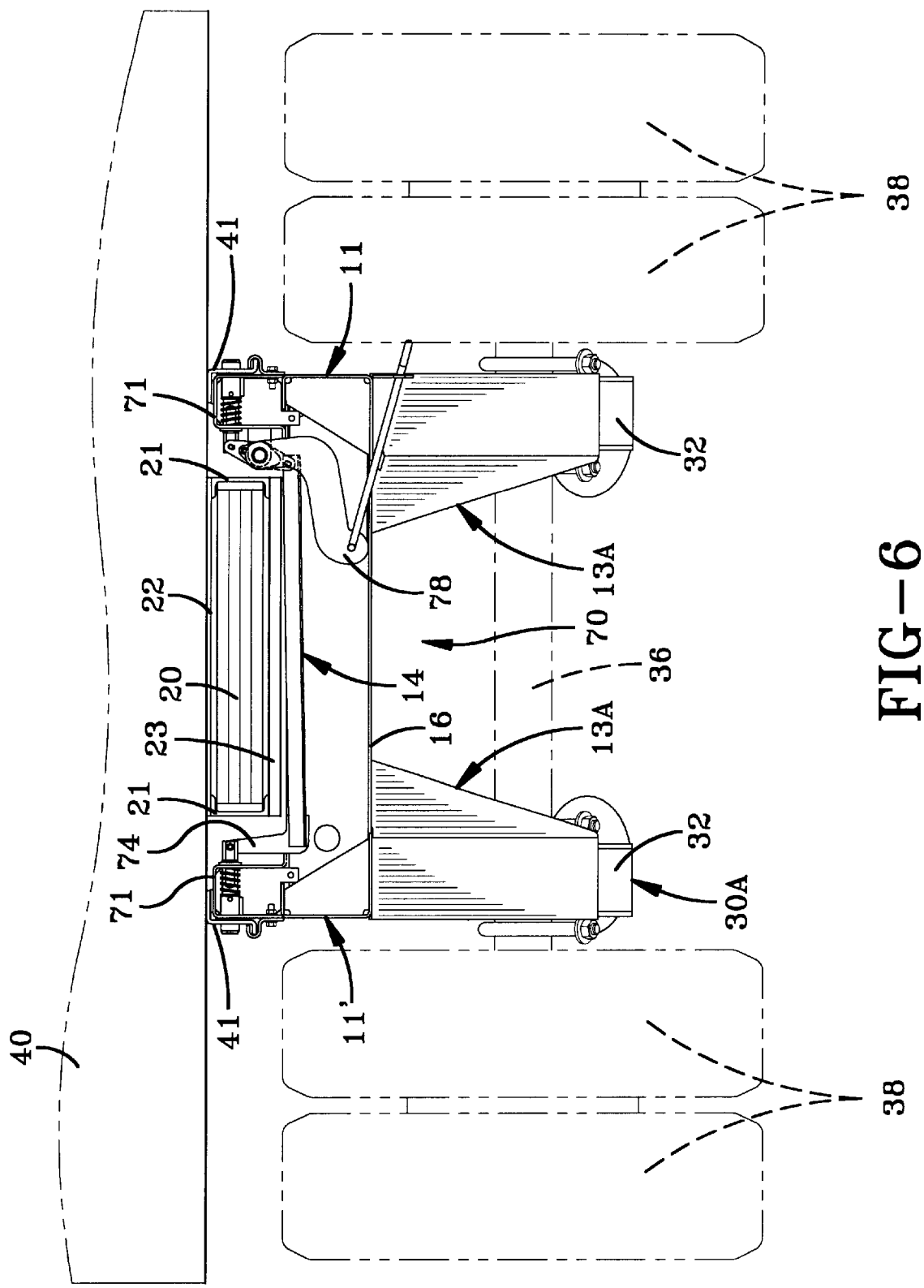
FIG. 6 is an enlarged fragmentary front view, with portions shown in phantom lines, of the slider and trailer shown in FIG. 5.

So that the ramp-accommodating movable subframe or slider for a semi-trailer of the present invention can be better understood, a prior art slider of a tractor trailer used in conjunction with a storable walk ramp is indicated generally at 10 and is shown in FIGS. 1–3. Slider 10 includes a pair of main members 11, 11', front and rear generally K-shaped cross member structures 12A and 12B, respectively, front and rear pairs of hangers 13A and 13B, respectively, for suspending axle/suspension systems, and a retractable locking pin mechanism 14.

Specifically, each main member 11,11' is an elongated, generally C-shaped beam made of a metal such as steel or other suitable material (FIG. 1). The open portion of each main member 11,11' is opposed to the open portion of the other main member and faces inboard relative to slider 10. Main members 11,11' are connected to each other in spaced-apart parallel relationship by K-shaped cross member structures 12A, B.

Each K-shaped cross member structure 12A and 12B includes a base member 16 which extends between and is perpendicular to main members 11,11' (FIG. 1). The open portion of each base member 16 faces in a frontward direction. Each end of base member 16 nests in the open portion of a respective one of main members 11,11', and is secured therein by any suitable means such as welding or mechanical fastening. Each base member 16 is a generally C-shaped beam made of a metal such as steel or other suitable material. Each front hanger 13A is attached by welding or other suitable means, to the lowermost surface of a respective one of main members 11,11' at a location directly beneath base member 16 of front K-shaped cross member structure 12A. Each rear hanger 13B similarly is attached at a location directly beneath base member 16 of rear K-shaped cross member structure 1213. Each K-shaped cross member structure 12A and 12B further includes a pair of inclined members 17, each of which is a generally C-shaped beam also made of a metal such as steel or other suitable material. The open portion of each inclined member 17 faces in an outboard-frontward direction, and each of the inclined members extends between generally the middle portion of base member 16 and a respective one of main members 11,11'. The front end of each inclined member 17 is attached at an angle to the rearwardmost surface of base member 16 by any suitable means such as welding or mechanical fastening, and the rear end of each of the inclined members is nested at an angle in the open portion of a respective one of main members 11,11', and also is attached thereto in any suitable manner such as by welding or mechanical fastening. An optional reinforcement bar 18 which extends between the rearwardmost ends of main members 11,11', adds additional strength to the structure, and its attached thereto by any suitable means such as welding or mechanical fastening. Thus, it can be seen that base member 16 and inclined members 17 form an integral K-shaped cross member structure 12 which interconnects and maintains main members 11,11' in a spaced-apart parallel relationship.

One or more openings 19 (FIG. 1) are formed in the vertically extending surface of each base member 16 and each inclined member 17, and each of the openings is aligned with corresponding openings formed in the other members to provide for passage of air and/or fluid conduits, electrical lines, and the like, used in the operation of the semi-trailer (not shown).

Each main member 11,11' has a pair of rail guides 25 mounted on its outboard surface by bolts 26 (FIGS. 1–3). Each rail guide 25 is mounted adjacent to a respective one of the ends of main members 11,11'. A low friction strip 27 is attached to the uppermost surface of each main member 11,11' by recessed fasteners 28, and extends generally the entire length of the main member. Strip 27 is formed of any suitable low-friction material, such as ultra-high molecular weight polyethylene.

As mentioned hereinabove, and as best shown in FIGS. 2 and 3, prior art slider 10 supports front and rear axle/suspension systems 30A and 30B, respectively. However, only front axle/suspension system 30A is described herein since the front and rear systems are identical in structure and operation. Moreover, inasmuch as axle/suspension system 30A is suspended from slider 10, but does not form an integral part thereof, only the major components of system 30A will be cited for aiding in the description of the environment in which the slider is used in conjunction with a storable walk ramp. Axle/suspension system 30A includes generally identical suspension assemblies 31 suspended from each hanger 13A of the pair of front hangers. A reinforcement box 15 is mounted by any suitable means in the open portion of each main member 11,11' frontward of and adjacent to each end of each of base members 16, to provide additional strength to slider 10 for supporting hangers 13A, B, and their associated suspension assemblies 31. Each suspension assembly 31 includes a suspension beam 32 which is pivotally mounted on hanger 13A in a usual manner. An air spring 33 is suitably mounted on and extends between the upper surface of the rearwardmost end of suspension beam 32 and main member 11,11', at a location directly beneath the outboard end of a respective one of inclined members 17 of K-shaped cross-member structure 12A. A shock absorber 34 extends between and is mounted on suspension beam 32 and hanger 13A. Another component of suspension assembly 31, mentioned herein only for the sake of relative completeness, is an air brake (not shown). An axle 36 extends between and is captured in the pair of suspension beams 32 of axle/suspension system 30A by U-bolts 29. One or more wheels 38 is mounted on each end of axle 36.

It should be noted that suspension assembly 31 is of the type commonly referred to as an underslung-type suspension assembly. That is, axle 36 is mounted on top of suspension beam 32 rather than below it, the latter type being typically referred to as an overslung-type suspension assembly. Underslung-type suspension assemblies 31 usually are utilized on sliders intended for installation on semi-trailers incorporating a walk ramp. This is because, in most cases, adequate clearance is lacking beneath the semi-trailer for an overslung-type suspension assembly due to the incorporation of the walk ramp below the semi-trailer, as will become apparent hereinbelow both for prior art slider 10 and the ramp-accommodating slider of the present invention.

Slider 10 is movably mounted on trailer body 40 by slidable engagement of rail guides 25 with spaced-apart, parallel and generally Z-shaped rails 41 (FIGS. 2 and 3). In order to accommodate storage of a walk ramp 20 beneath trailer body 40, each Z-shaped rail 41 is mounted on and depends from the underside of a respective one of a pair of spaced-apart spacer tubes 39, which in turn are mounted on and depend as from the underside of the trailer body. In the absence of a walk ramp 20, spacer tubes 39 would not be required and rails 41 would be mounted directly on and depend from the underside of trailer body 40. In addition, in the absence of spacer tubes 39, enough vertical clearance would exist beneath trailer body 40 to allow for the use of an overslung-type suspension assembly. Each low friction strip 27 abuts the bottom surface of the uppermost portion of a respective one of rails 41 to provide a smooth, generally low-friction contact surface for slidable movement of slider 10 on trailer body 40.

Walk ramp 20 is a usual walk ramp well known to the art and to the literature, and is slidably mounted on a pair of spaced-apart elongated brackets 21. Brackets 21 are mounted, by any suitable means such as welding, to a plurality of transversely extending straps 22 (only one shown), which in turn are suitably securely mounted on the underside of trailer body 40. A bottom reinforcement member 23 is attached to and extends transversely between brackets 21 to assist straps 22 in maintaining the spaced-apart parallel relationship of the brackets, thereby enabling smooth movement of walk ramp 20 out of and into the brackets for use and storage, respectively. It can be appreciated, particularly in viewing FIGS. 2–3, that spacer tubes 39 provide sufficient clearance or a bay for mounting ramp 20, and the carrier for the ramp comprising brackets 21, straps 22, and reinforcement member 23 beneath trailer body 40, and above slider 10. The arrangement of parts of ramp 20 and its carrier typically has a cross-section of about six inches height by twenty-eight inches width. However, spacer tubes 39 extend the entire length of trailer body rails 41, thus adding significant unwanted weight to the overall weight of the semi-trailer. Walk ramp 20 can be slidably pulled rearwardly along brackets 21 and out of its storage position shown in FIGS. 2 and 3, with its rearwardmost end resting on the ground or other surface and its frontwardmost end remaining slidably engaged with brackets 21, to enable an individual to walk up and down the sloping ramp for loading and unloading of items from the trailer such as appliances, frozen foods and the like.

Slider 10 can be selectively positioned relative to trailer body 40 for optimum load distribution by retractable locking pin mechanism 14 (FIGS. 1–3). Pin mechanism 14 includes an elongated pivot rod 45 which passes rearwardly through an aligned pair of openings (not shown) formed in base member 16 and a predetermined one of inclined members 17 of front K-shaped cross member 12A adjacent to main member 11. A lever 43 is attached, by welding or other suitable means, to pivot rod 45 adjacent to the front end of the rod and frontwardly adjacent to base member 16 of front K-shaped cross member 12A. A first end of an elongated arm 44 is pivotally attached by any suitable means to a lower end of lever 43. A second end of arm 44 is pivotally attached by any suitable means to the inboard end of a pin 49 disposed adjacent to opposite main member 11'. An upper end of lever 43 is pivotally attached by any suitable means to the inboard end of a pin 59 disposed adjacent to main member 11. A lever 47 similarly is attached to pivot rod 45 adjacent to the rear end of the rod and frontwardly adjacent to base member 16 of rear K-shaped cross member 12B. A first end of an elongated arm 48 is pivotally attached to a lower end of lever 47. A second end of arm 48 is pivotally attached to the inboard end of a pin 69 disposed adjacent to opposite main member 11'. An upper end of lever 47 is pivotally attached to the inboard end of a pin 79 disposed adjacent to main member 11.

The inboard end of each pin 49, 59, 69, 79 is slidably mounted in an opening (not shown) formed in a bracket 51 which is attached by suitable means such as welding to a respective one of base members 16. An enlarged outboard end of each pin 49, 59, 69, 79 passes through an opening (not shown) formed in a respective one of main members 11,11'.

The above-described arrangement of parts including levers 43, 47, elongated arms 44, 48, pivot rod 45, and pins 49, 59, 69, 79, can be manually actuated by handle assembly 58. It is understood that retractable locking pin mechanism also could be pneumatically actuated. Inasmuch as handle assembly 58 and its operation does not affect the present invention, and could take various forms, only the general arrangement of parts and its operation will be described immediately below. An inboard end of an elongated handle 42 of handle assembly 58 is mounted on a lower end of a C-shaped arm 46 by any suitable means. An outboard end of handle 42 extends outwardly away from main member 11 through an opening (not shown) formed in a rectangular-shaped plate 53, which is attached by any suitable means such as welds to a front surface of hanger 13A and the bottom surface of main member 11 from which the hanger depends. An upper end of arm 46 is operatively connected, by any suitable means, to pivot rod 45.

Locking pin mechanism 14 is useful in locking slider 10 in a selected position relative to trailer body 40. Specifically, the main member pin openings of slider 10 are aligned with selected ones of a plurality of correspondingly sized openings 55 formed in rails 41 of trailer body 40 (FIG. 2). Each pin 49, 59, 69, 79 automatically extends through the selected aligned openings since the pin is biased in an outboard direction by a coil spring 56 captured between bracket 51 and the enlarged outboard end of the pin. When it is again desired by the operator of the semi-trailer to move slider 10 beneath trailer body 40 using locking mechanism 14, the parking brake of the trailer is engaged, and handle 42 is manually pulled to an outboard position to cause rotation of pivot rod 45 in a counterclockwise direction, when viewed from the front of slider 10, to overcome the bias of coil springs 56 and permit retraction of pins 49, 59, 69, 79 out of the aligned openings formed in slider main members 11, 11' and rails 41. Thus, slider 10 can be selectively adjusted by moving the slider longitudinally along rails 41 beneath trailer body 40 until the main member openings of slider 10 align with selected rail openings 55, and pins 49, 59, 69, 79 engage therewith as is described hereinabove, for maximizing load distribution. More specifically, handle 42 then can be pushed to an inboard position to cause rotation of pivot rod 45 in a clockwise direction, thus enabling the bias of coil springs 56 to urge pins 49, 59, 69, 79 in an outboard direction to the extended locked position in the aligned openings.

Turning now to ramp-accommodating movable subframe for a semi-trailer 70 of the present invention, only the differences between present invention slider 70 and prior art slider 10 will be described hereinbelow. In accordance with one of the key features of the present invention, a slider cap or spacer member 71 is mounted on the top surface of each of main members 11, 11' in spaced-apart parallel relationship. Each spacer 71 is formed of a sturdy material such as steel, and is generally an inverted U-shaped member. The inboard lower edge of spacer 71 is formed with a horizontally inboardly extending flange 72, which rests on and is welded to K-shaped cross-member structures 12A, 12B to assist in stabilizing spacer 71 for mounting on slider 70. The outboard lower edge of each spacer 71 also is welded to its respective main member 11, 11'. However, mechanical fastening of spacers 71 to slider 70 could alternatively be employed, without affecting the overall concept of the present invention. In order to allow stresses, such as horizontal loads, to be efficiently directed into slider 70, a plurality of vertically disposed gussets 73 are welded to the interior surfaces of each spacer 71 and its respective main member 11, 11'. Gussets 73 are disposed adjacent to the outboard ends of base members 16 and inclined members 17 of K-shaped cross member structures 12, and are generally aligned therewith. Each low friction strip 27 and fasteners 28 are relocated to the uppermost surface of its respective spacer 71 from the uppermost surface of slider main members 11, 11'. In addition, locking pins 49, 59, 69, 79, coil springs 56, and the pin openings formed in main members 11, 11' are relocated upwardly to spacers 71. Rail guides 25 and bolts 26 also are relocated upwardly to spacers 71. The inboard wall of spacers 71 replace brackets 51. In order to make this relocation possible, an arm 74 must be pivotally disposed between each of pins 49 and 69 and their respective elongated arms 44, 48 in order to operatively connect the pins to the other parts of locking mechanism 14 which are disposed on or adjacent to main members 11 and K-shaped cross member structures 12. Pivot rod 45 also is relocated upwardly adjacent to its respective spacer 71, in order to operatively connect pins 59, 79 to the other parts of locking mechanism 14. Since spacers 71 are not open on their inboard side as are slider main members 11, 11', an access plate 75 is removably fastened to the inboard surface of each spacer 71 to provide access to pins 49, 59, 69, 79 and the associated parts of locking mechanism 14 disposed within spacers 71. Relocation of the above-described parts into spacers 71 enables slider 70 to be utilized with standard rails 41 found on newly manufactured trailer bodies 40, or for retrofitting onto semi-trailers having standard body rails. Finally, C-shaped arm 46 of handle assembly 58 is replaced with a generally S-shaped arm 78 to enable full travel of attached and relocated pivot rod 45 for pin retraction and locking, without arm 78 encountering interference from main member 11 or bracket 21 of the ramp carrier adjacent to the arm.

It can thus be seen that slider 70 of the present invention saves a significant amount of weight for a semi-trailer incorporating a walk ramp by eliminating the need to utilize ramp-accommodating spacer tubes 39 such as used in prior art sliders 10, which extend the entire length of trailer body rails 41. Instead, ramp-accommodating slider 70 of the present invention utilizes spacers 71 attached directly to slider 70 which are only about one-third to one-half the length of tubes 39, thus saving substantial weight. Moreover, slider 70 of the present invention can be utilized on new trailer manufacturing, and can also be efficiently utilized in retrofit applications simply by removal of a prior art slider and replacement with slider 70 of the present invention. In contrast, retrofitting a ramp 20 and its carrier hardware onto a trailer having a prior art slider 10 requires cutting rails 41 off of trailer body 40, mounting spacer tubes 39 beneath the trailer body, and then reattaching rails 41 to the spacer tubes and mounting slider 10 thereon. The present invention eliminates this process.

It is understood that the overall concept of the present invention, namely, attaching spacers 71 directly to slider 70, can be used on various types of sliders having various types of retractable locking pin mechanisms and various types of axle/suspension systems. A single type of slider and associated retractable locking pin mechanism and suspension assembly was described herein only to illustrate one environment in which the present invention can be utilized. Also, spacers 71 could take other forms without affecting the concept of the invention.

Accordingly, the ramp-accommodating movable subframe for a semi-trailer is simplified, provides an effective, safe, inexpensive, and efficient system which achieves all the enumerated objectives, provides for eliminating difficulties encountered with prior ramp-modified semitrailers, and solves problems and obtains new results in the art.

In the foregoing description, certain terms have been used for brevity, clearness and understanding; but no unnecessary limitations are to be implied therefrom beyond the requirements of the prior art, because such terms are used for descriptive purposes and are intended to be broadly construed.

Moreover, the description and illustration of the invention is by way of example, and the scope of the invention is not limited to the exact details shown or described.

Having now described the features, discoveries and principles of the invention, the manner in which the ramp-accommodating movable subframe for a semi-trailer is constructed, arranged and used, the characteristics of the construction and arrangement, and the advantageous, new and useful results obtained; the new and useful structures, devices, elements, arrangements, parts and combinations are set forth in the appended claims.

What is claimed is:

1. A subframe structure for a vehicle trailer, said subframe structure being movably mountable on spaced-apart, parallel and longitudinally extending elongated rails mounted on the bottom of said trailer, said trailer rails each being formed with a plurality of openings, said subframe structure including a pair of spaced-apart, parallel and longitudinally extending elongated main members, and at least one cross-member structure extending between and being connected to said main members to maintain the spaced-apart parallel relationship between the main members, wherein the improvement comprises:

a) an elongated spacer member mounted on each of said main members and extending substantially the entire length of said main members, said spacer members each including means for movably engaging a respective one of said trailer rails, the spacer members each further being formed with at least one locking pin opening, said spacer member opening being selectively alignable with its respective trailer rail openings; and b) at least one locking pin mounted on each of said spacer members adjacent to its respective locking pin opening, said locking pin further being generally complementary-sized and shaped for passage through the respective aligned openings, the locking pin being operatively connected to a locking pin retraction mechanism, said retraction mechanism and said locking pin being operable for locking the subframe structure in one selected position relative to said vehicle trailer when the locking pin extends through said aligned openings, and for unlocking said subframe structure for moving the subframe structure to another selected position beneath the trailer when said locking pin is retracted from the aligned openings, the spacer members providing a bay generally defined by said bottom of said trailer, said subframe cross-member structure and said spacer members, so that a walk ramp is mountable in said bay.

2. The subframe structure for a vehicle trailer subframe structure of claim 1, in which said elongated spacer member is a generally inverted U-shaped member.

3. The subframe structure for a vehicle trailer subframe structure of claim 2, in which said spacer member is formed with a horizontal inboardly extending integral flange which rests on and is attached to said cross-member structure.

4. The subframe structure for a vehicle trailer subframe structure of claim 3, in which said spacer member is attached to said subframe structure by welds.

5. The subframe structure for a vehicle trailer subframe structure of claim 3, in which said spacer member is attached to said subframe structure by mechanical fasteners.

6. The subframe structure for a vehicle trailer subframe structure of claim 2, in which a plurality of reinforcement gussets is mounted within each spacer member.

7. The subframe structure for a vehicle trailer subframe structure of claim 2, in which an access opening is formed in an inboard vertical wall of each spacer member adjacent to its respective locking pin; and in which an access plate is removably mounted on the access opening.

8. The subframe structure for a vehicle trailer subframe structure of claim 2, in which a coil spring is captured between an enlarged outboard end of each of said locking pins and an inboard vertical wall of its respective spacer member.

9. The subframe structure for a vehicle trailer subframe structure of claim 2, in which a low friction strip is mounted on a horizontal upper surface of each of said spacer members and extends substantially the entire length of the member.

10. The subframe structure for a vehicle trailer subframe structure of claim 2, in which an extension arm operatively connects an inboard end of at least one of said locking pins to said retraction mechanism.

11. The subframe structure for a vehicle trailer subframe structure of claim 10, in which a locking pin is mounted adjacent to each end of each of said spacer members; in which each one of said pair of said locking pins of a selected one of said spacer members is operatively connected to said retraction mechanism by said extension arm; in which each one of the other of said pair of said locking pins of the other one of said spacer members is operatively connected by a lever to an elongated pivot rod of the retraction mechanism mounted adjacent to an inboard vertical wall of said other one of the spacer members; and in which a generally S-shaped arm operatively connects said pivot rod to actuation means for controlling movement of the pivot rod for locking and unlocking said pins.

* * * * *